United States Patent
Peng et al.

(10) Patent No.: US 10,054,848 B1
(45) Date of Patent: Aug. 21, 2018

(54) PROJECTOR AND OPTICAL LENS MECHANISM THEREOF

(71) Applicant: QISDA CORPORATION, Taoyuan (TW)

(72) Inventors: Wei-Chun Peng, Taoyuan (TW); Chi-Hung Hsiao, Taoyuan (TW); Wen-Chung Ho, Taoyuan (TW); Ying-Fang Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/782,859

(22) Filed: Oct. 13, 2017

(30) Foreign Application Priority Data

Sep. 25, 2017 (CN) .......................... 2017 1 0876342

(51) Int. Cl.
| | |
|---|---|
| *G03B 21/14* | (2006.01) |
| *G02B 13/16* | (2006.01) |
| *H04N 9/31* | (2006.01) |
| *G02B 27/09* | (2006.01) |
| *G02B 7/02* | (2006.01) |

(52) U.S. Cl.
CPC ........... *G03B 21/145* (2013.01); *G02B 7/021* (2013.01); *G02B 13/16* (2013.01); *G02B 27/0955* (2013.01); *H04N 9/3141* (2013.01); *G03B 21/142* (2013.01)

(58) Field of Classification Search
CPC .... G03B 21/145; G03B 21/14; H04N 9/3141; G02B 13/16; G02B 7/021; G02B 7/02
USPC ............. 353/98, 99, 119; 359/649, 650, 651
See application file for complete search history.

(56) References Cited

U.S. PATENT DOCUMENTS

| | | | |
|---|---|---|---|
| 2007/0035705 A1* | 2/2007 | Hurd ...................... | G03B 11/00 353/110 |
| 2013/0120720 A1* | 5/2013 | Hellin .................... | G02B 7/021 353/101 |
| 2017/0031127 A1* | 2/2017 | Tsuchiya ................ | G02B 7/028 |

* cited by examiner

*Primary Examiner* — Ryan Howard

(57) ABSTRACT

A projector includes a holding casing having a hole structure, a projection lens movably disposed through the hole structure, a containing casing detachably fixed to the holding casing for forming a containing space, an image projection module disposed in the containing space, and a flexible washer. A first engaging structure is formed on an external surface of the projection lens. The flexible washer jackets the projection lens and has first and second ring structures and a connection ring structure formed therebetween. The first engaging structure is engaged with the second engaging structure of the first ring structure for positioning the first ring structure on the projection lens. The second ring structure is clamped between the holding casing and the containing casing for sealing the containing space cooperatively with the connection ring structure and the first ring structure when the containing casing is fixed to the holding casing.

20 Claims, 4 Drawing Sheets

PROJECTOR AND OPTICAL LENS MECHANISM THEREOF

BACKGROUND OF THE INVENTION

1. Field of the Invention

The present invention relates to a projector and an optical lens mechanism thereof, and more specifically, to a projector having a flexible washer deformed with movement of a projection lens and an optical lens mechanism thereof.

2. Description of the Prior Art

Projectors are commonly used for presentations at conferences, academic societies and exhibitions. In general, a conventional projector modulates and combines a light beam of a light source in accordance with image information provided from an image projection module, and projects the light beam on a projection screen in an enlarged manner via a projection lens, so as to display images on the projection screen.

In the aforesaid projector, the projection lens is movably disposed through a hole structure of a holding casing for adjusting an image projection position on the projection screen and the holding casing is assembled with a containing casing to cooperatively form a containing space for containing the image projection module. However, since there is usually an assembly gap formed between the projection lens and the holding casing or between the holding casing and the containing casing, dust possibly enters the containing space through the assembly gap to damage the image projection module or influence the heat dissipating efficiency of the image projection module. Although the projector could dispose a sponge washer among the projection lens, the holding casing and the containing casing for sealing the containing space, the sponge washer is broken easily due to movement of the projection lens relative to the holding casing.

SUMMARY OF THE INVENTION

The present invention provides a projector. The projector includes a holding casing, a projection lens, a containing casing, an image projection module, and a flexible washer. The holding casing has a hole structure. The projection lens is movably disposed through the hole structure. A first engaging structure is formed on an external surface of the projection lens. The containing casing is detachably fixed to the holding casing for forming a containing space. The image projection module is disposed in the containing space for performing image projection cooperatively with the projection lens. The flexible washer jackets the projection lens and has a first ring structure, a connection ring structure, and a second ring structure. The first ring structure has a second engaging structure formed thereon corresponding to the first engaging structure. The first engaging structure is engaged with the second engaging structure for positioning the first ring structure on the projection lens when the flexible washer jackets the projection lens. The connection ring structure extends from the first ring structure to the second ring structure. The second ring structure is clamped between the holding casing and the containing casing for sealing the containing space cooperatively with the connection ring structure and the first ring structure when the containing casing is fixed to the holding casing.

The present invention further provides an optical lens mechanism. The optical lens mechanism includes a holding casing, an optical lens, a containing casing, an optical image processing module, and a flexible washer. The holding casing has a hole structure. The optical lens is movably disposed through the hole structure. A first engaging structure is formed on an external surface of the optical lens. The containing casing is detachably fixed to the holding casing for forming a containing space. The optical image processing module is disposed in the containing space for performing optical image processing cooperatively with the optical lens. The flexible washer jackets the optical lens and has a first ring structure, a connection ring structure, and a second ring structure. The first ring structure has a second engaging structure formed thereon corresponding to the first engaging structure. The first engaging structure is engaged with the second engaging structure for positioning the first ring structure on the optical lens when the flexible washer jackets the optical lens. The connection ring structure extends from the first ring structure to the second ring structure. The second ring structure is clamped between the holding casing and the containing casing for sealing the containing space cooperatively with the connection ring structure and the first ring structure when the containing casing is fixed to the holding casing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
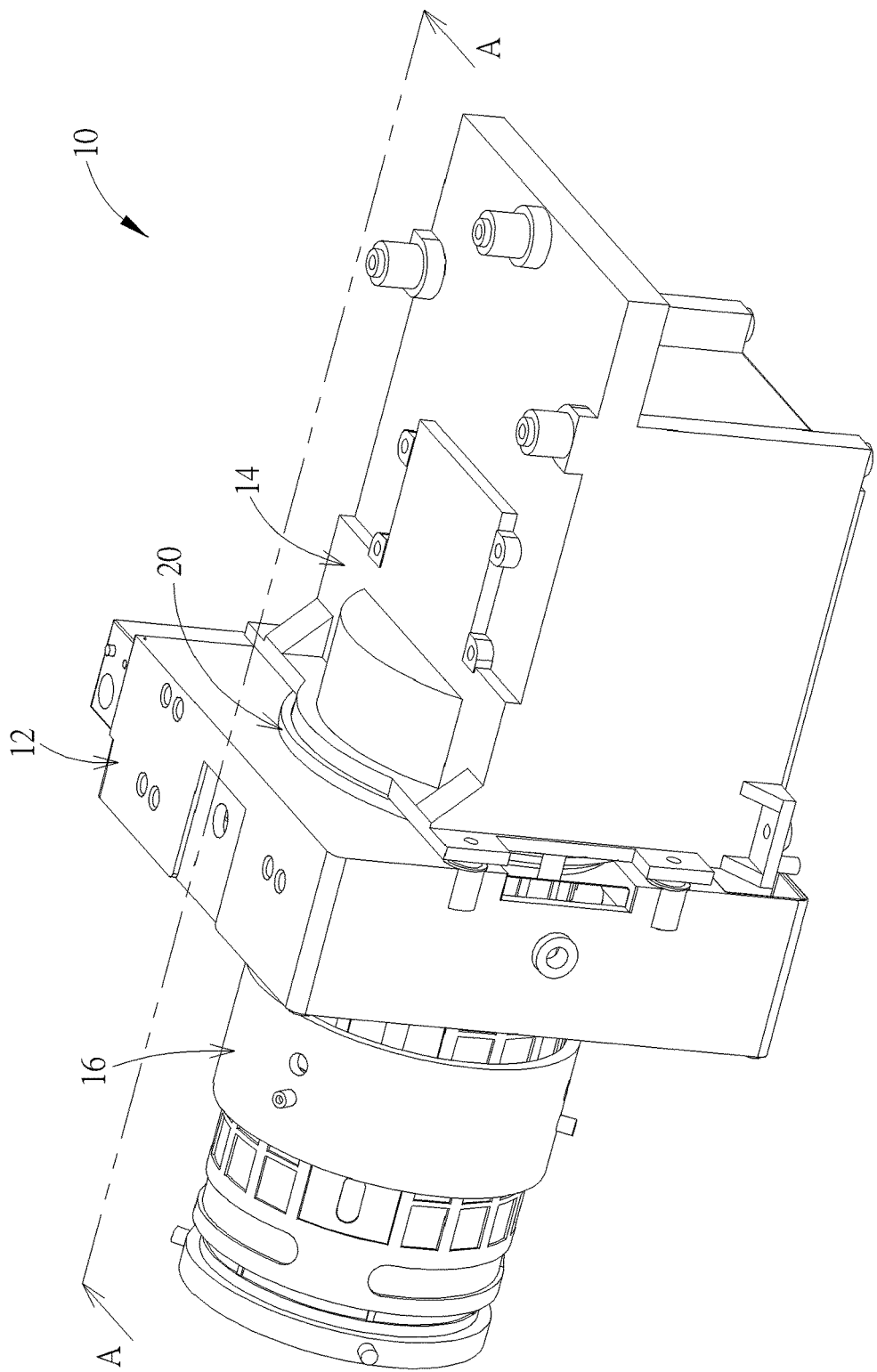
FIG. 1 is a diagram of a projector according to an embodiment of the present invention.
Figure 2:
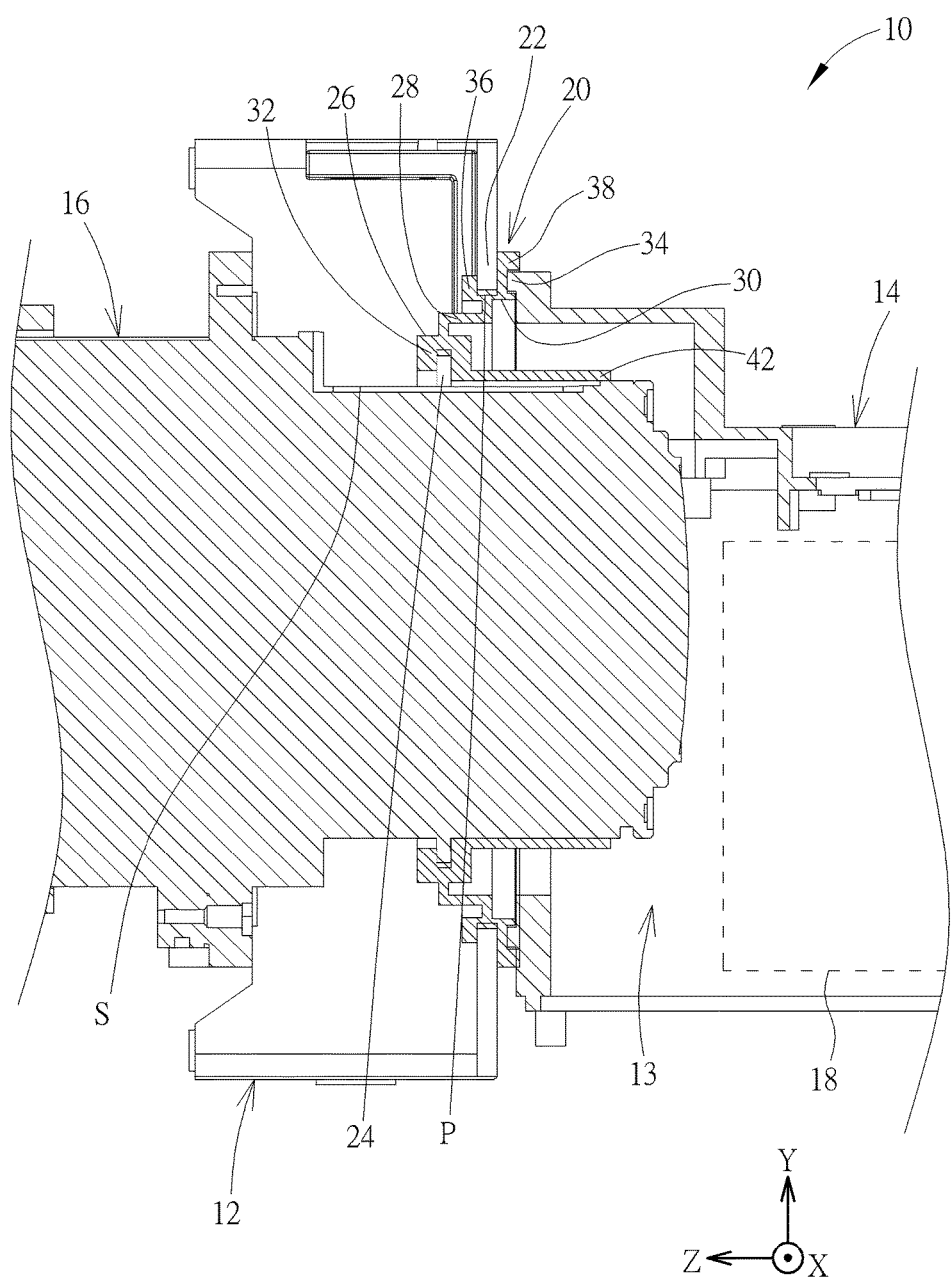
FIG. 2 is a partial cross-sectional diagram of the projector along a cross-sectional line A-A.
Figure 3:
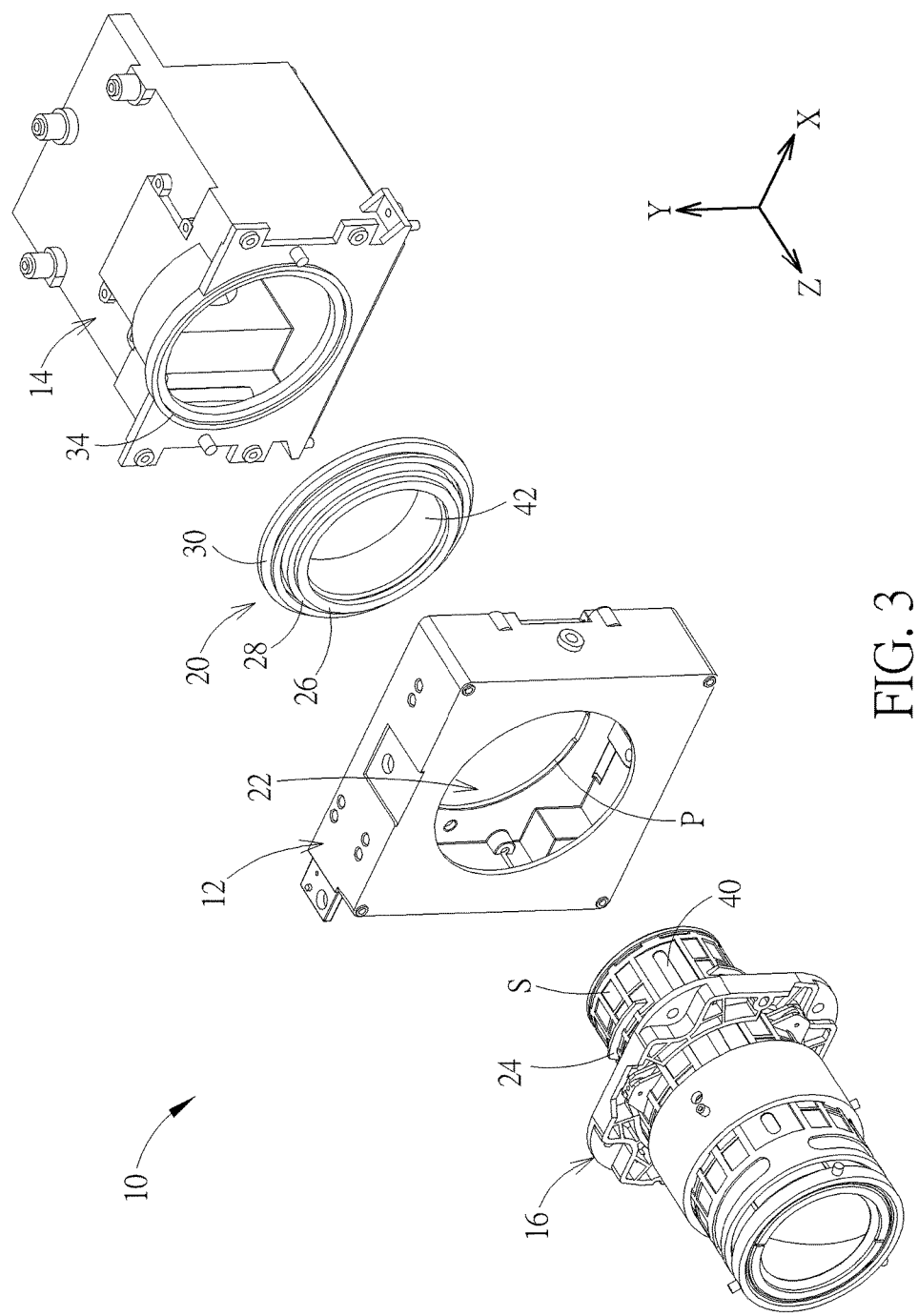
FIG. 3 is an exploded diagram of the projector in FIG. 1.

Please refer to FIG. 1, FIG. 2, and FIG. 3. FIG. 1 is a diagram of a projector 10 according to an embodiment of the present invention. FIG. 2 is a partial cross-sectional diagram of the projector 10 along a cross-sectional line A-A. FIG. 3 is an exploded diagram of the projector 10 in FIG. 1. The projector 10 could preferably be a conventional projection apparatus (e.g. a short throw projector, but not limited thereto), and for clearly showing the internal structural design of the projector 10, an external housing structure (it could be a projector housing commonly seen in the prior art, and the related description is omitted herein for simplicity) of the projector 10 is omitted in FIG. 1.

As shown in FIG. 1, FIG. 2 and FIG. 3, the projector 10 includes a holding casing 12, a containing casing 14, a projection lens 16, an image projection module 18 (briefly depicted by dotted lines in FIG. 2), and a flexible washer 20. The containing casing 14 is detachably fixed to the holding casing 12 (e.g. by screws) for forming a containing space 13. The holding casing 12 has a hole structure 22, and the projection lens 16 is movably disposed through the hole structure 22 for projection position adjustment. The image projection module 18 includes major projection optical components (e.g. a light source, a color filter, a digital micromirror device, etc.) applied to a projector and is disposed in the containing space 13 for performing image projection cooperatively with the projection lens 16, and the related description is omitted herein since it is commonly seen in the prior art.

Figure 4:
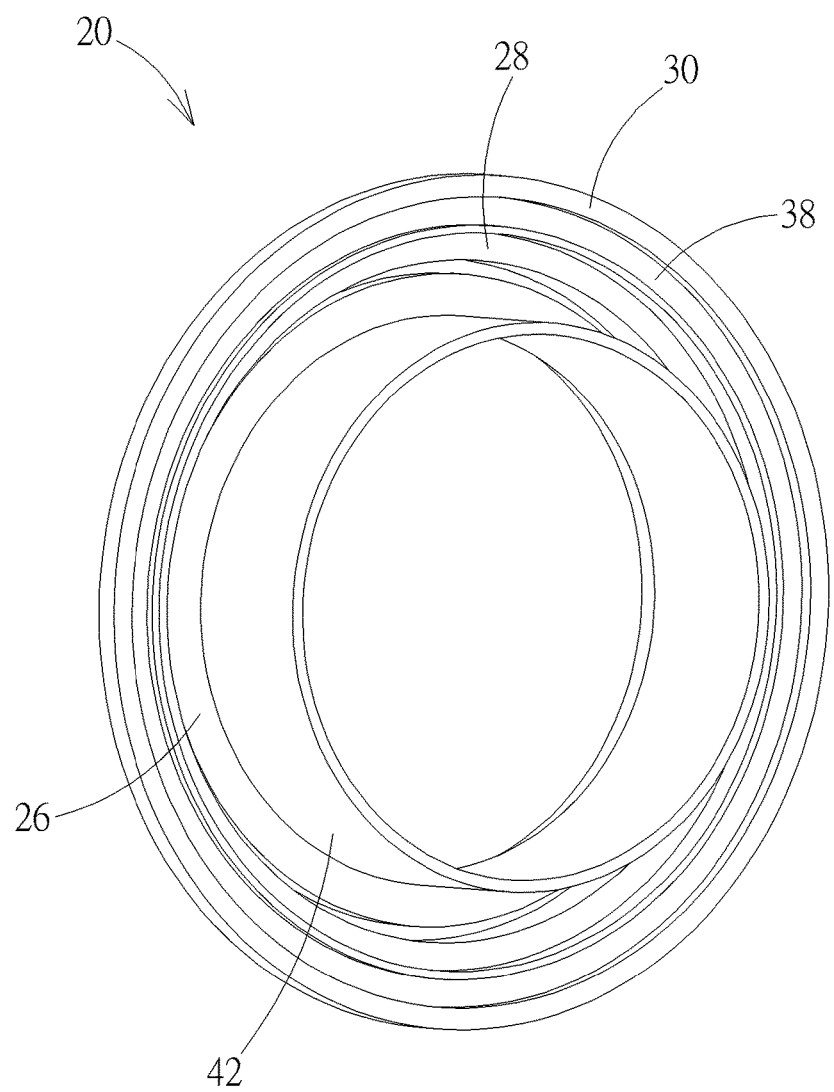
FIG. 4 is an enlarged diagram of a flexible washer in FIG. 3 from another viewing angle.

More detailed description for the structural design of the flexible washer 20 is provided as follows. Please refer to FIG. 2, FIG. 3, and FIG. 4. FIG. 4 is an enlarged diagram of the flexible washer 20 in FIG. 3 from another viewing angle. The flexible washer 20 could preferably be made of rubber material, but not limited thereto, meaning that the present invention could adopt other type of flexible material, such as flexible resin material. As shown in FIG. 2, FIG. 3, and FIG. 4, a first engaging structure 24 is formed on an external surface S of the projection lens 16, and the flexible washer 20 jackets the projection lens 16 and has a first ring structure 26, a connection ring structure 28, and a second ring structure 30. The first ring structure 26 has a second engaging structure 32 formed thereon corresponding to the first engaging structure 24. The connection ring structure 28 extends from the first ring structure 26 to the second ring structure 30.

In this embodiment, the first engaging structure 24 could be an engaging rib and the second engaging structure 32 could be an engaging groove. To be more specific, as shown in FIG. 2, a cross-sectional surface of the first ring structure 26 along a radial direction (i.e. a Y-axis as shown in FIG. 2) of the flexible washer 20 is U-shaped to form the engaging groove to be engaged with the engaging rib. Accordingly, the first engaging structure 24 can be engaged with the second engaging structure 32 (preferably in an interference fitting manner as shown in FIG. 2, but not limited thereto), so as to position the first ring structure 26 on the projection lens 16 when the flexible washer 20 jackets the projection lens 16. To be noted, the structural designs of the first engaging structure 24 and the second engaging structure 32 are not limited to FIG. 2, meaning that the present invention could adopt other concave-convex engaging structural design in another embodiment.

Furthermore, in this embodiment, the containing casing 14 could have an engaging rib 34 protruding toward the holding casing 12 to clamp the second ring structure 30 cooperatively with the holding casing 12, and the second ring structure 30 could have a first engaging groove 36 (preferably U-shaped as shown in FIG. 2, but not limited thereto) formed thereon corresponding to a periphery P of the hole structure 22 and a second engaging groove 38 (preferably U-shaped as shown in FIG. 2, but not limited thereto) formed thereon corresponding to the engaging rib 34. Accordingly, the periphery P of the hole structure 22 can be engaged with the first engaging groove 36 (preferably in an interference fitting manner as shown in FIG. 2, but not limited thereto) for positioning the second ring structure 30 on the holding casing 12, and the engaging rib 34 can be engaged with the second engaging groove 38 for positioning the containing casing 14 on the holding casing 12 via the flexible washer 20.

In practical application, for ensuring that the connection ring structure 28 can deform more easily than the first ring structure 26 and the second ring structure 30, as shown in FIG. 2, a thickness of the first ring structure 26 and a thickness of the second ring structure 30 could preferably be larger than a thickness of the connection ring structure 28 in the radial direction (i.e. the Y-axis) of the flexible washer 20, and a cross-sectional surface of the connection ring structure 28 along the radial direction of the flexible washer 20 could preferably be in a stepped shape.

Moreover, as shown in FIG. 3, a guide slot 40 could be formed on the external surface S of the projection lens 16 for guiding longitudinal movement of the projection lens 16 (i.e. along a Z-axis as shown in FIG. 3) relative to the holding casing 12. Thus, as shown in FIG. 3 and FIG. 4, a covering sleeve structure 42 could extend from the first ring structure 26 for covering the guide slot 40 when the flexible washer 20 jackets the projection lens 16, so as to prevent dust from entering the containing space 13 via the guide slot 40.

Via the aforesaid designs, when the user wants to assemble the projection lens 16 with the holding casing 12, the flexible washer 20, and the containing casing 14, the user just needs to assemble the projection lens 16 with the holding casing 12 first, so that the projection lens 16 could be movably disposed through the holding casing 12. Subsequently, the user can make the flexible washer 20 jacket the projection lens 16, and then make the first engaging structure 24 and the first engaging groove 36 be engaged with the second engaging structure 32 and the periphery P of the hole structure 22 respectively, so as to position the flexible washer 20 between the projection lens 16 and the holding casing 12. Finally, the user can make the engaging rib 34 of the containing casing 14, which has the image projection module 18 disposed therein, be engaged with the second engaging groove 38 to position the containing casing 14 on the holding casing 12, and then fix the containing casing 14 to the holding casing 12 securely (e.g. by screws) to clamp the second ring structure 30.

Accordingly, via engagement of the first engaging structure 24 and the second engaging structure 32, engagement of the periphery P of the hole structure 22 and the first engaging groove 36, engagement of the engaging rib 34 and the second engaging groove 38, and clamping the second ring structure 30 between the holding casing 12 and the containing casing 14, the flexible washer 20 can be assembled with the projection lens 16, the holding casing 12 and the containing casing 14 more quickly and conveniently, and the containing space 13 can be sealed more firmly by the flexible washer 20.

In such a manner, the present invention can surely prevent dust from entering the containing space 13 for achieving the dustproof effect. Furthermore, via the structural design of the flexible washer 20 to make the connection ring structure 28 adaptively deformed with movement of the projection lens 16 relative to the holding casing 12 (e.g. along an X-axis or the Y-axis as shown in FIG. 2, but not limited thereto), the present invention can efficiently prevent the flexible washer 20 from being broken during movement of the projection lens 16 relative to the holding casing 12, so as to solve the prior art problem that the sponge washer is broken easily when the projection lens moves relative to the holding casing.

It should be mentioned that the first engaging groove, the second engaging groove, and the covering sleeve structure are omissible components to simplify the structural design of the flexible washer provided by the present invention. For example, in another embodiment, the present invention could only utilize engagement of the first engaging structure of the projection lens and the second engaging structure of the first ring structure and clamping the second ring structure between the holding casing and the containing casing, to seal the containing space.

Furthermore, the present invention is not limited to be applied to a projector. For example, in another embodiment, the present invention can be applied to an optical lens mechanism. Components both mentioned in this embodiment and the aforesaid embodiment represent components with similar structures or functions.

In brief, the aforesaid optical lens mechanism could preferably be an image capturing apparatus (e.g. a camera, but not limited thereto), and could include a holding casing, an optical lens, a containing casing, an optical image processing module, and a flexible washer. The containing casing is detachably fixed to the holding casing (e.g. by screws) for forming a containing space, and the optical lens is movably disposed through a hole structure of the holding casing. The optical image processing module includes major image processing components (e.g. CCD (Charge Coupled Device) or CMOS (Complementary Metal-Oxide Semiconductor)) applied to an image capturing apparatus and is disposed in the containing space for performing optical image processing cooperatively with the optical lens. A first engaging structure is formed on the optical lens, and the flexible washer jackets the optical lens and has a first ring structure, a connection ring structure, and a second ring structure. The first ring structure has a second engaging structure formed thereon corresponding to the first engaging structure. The connection ring structure extends from the first ring structure to the second ring structure. The second ring structure is clamped between the holding casing and the containing casing when the containing casing is fixed to the holding casing.

In such a manner, via engagement of the first engaging structure of the optical lens and the second engaging structure of the first ring structure and clamping the second ring structure between the holding casing and the containing casing, the containing space can be sealed by the flexible washer, so as to prevent dust from entering the containing space for achieving the dustproof effect and efficiently prevent the flexible washer from being broken during movement of the optical lens relative to the holding casing. As for other related description for the aforesaid optical lens mechanism (e.g. the design of positioning the second ring structure on the holding casing, the design of positioning the containing casing on the holding casing via the flexible washer, the design of utilizing a covering sleeve structure of the flexible washer to cover a guide slot on the optical lens when the flexible washer jackets the optical lens, etc.), it could be reasoned by analogy according to the aforesaid embodiment and omitted herein for simplicity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
   a holding casing having a hole structure;
   a projection lens movably disposed through the hole structure, a first engaging structure being formed on an external surface of the projection lens;
   a containing casing detachably fixed to the holding casing for forming a containing space;
   an image projection module disposed in the containing space for performing image projection cooperatively with the projection lens; and
   a flexible washer jacketing the projection lens and having a first ring structure, a connection ring structure, and a second ring structure, the first ring structure having a second engaging structure formed thereon corresponding to the first engaging structure, the first engaging structure being engaged with the second engaging structure for positioning the first ring structure on the projection lens when the flexible washer jackets the projection lens, the connection ring structure extending from the first ring structure to the second ring structure, the second ring structure being clamped between the holding casing and the containing casing for sealing the containing space cooperatively with the connection ring structure and the first ring structure when the containing casing is fixed to the holding casing.

2. The projector of claim 1, wherein a thickness of the first ring structure is larger than a thickness of the connection ring structure in a radial direction of the flexible washer.

3. The projector of claim 1, wherein the first engaging structure is an engaging rib, the second engaging structure is an engaging groove, and the engaging rib is engaged with the engaging groove in an interference fitting manner.

4. The projector of claim 3, wherein a cross-sectional surface of the first ring structure along the radial direction of the flexible washer is U-shaped for forming the engaging groove to be engaged with the engaging rib.

5. The projector of claim 1, wherein the second ring structure has a first engaging groove formed thereon corresponding to a periphery of the hole structure, and the periphery of the hole structure is engaged with the first engaging groove for positioning the second ring structure on the holding casing.

6. The projector of claim 5, wherein the periphery of the hole structure is engaged with the first engaging groove in an interference fitting manner.

7. The projector of claim 5, wherein the containing casing has an engaging rib protruding toward the holding casing for clamping the second ring structure cooperatively with the holding casing, the second ring structure further has a second engaging groove formed thereon corresponding to the engaging rib, and the engaging rib is engaged with the second engaging groove for positioning the containing casing on the holding casing.

8. The projector of claim 1, wherein a thickness of the second ring structure is larger than a thickness of the connection ring structure in a radial direction of the flexible washer.

9. The projector of claim 1, wherein a cross-sectional surface of the connection ring structure along a radial direction of the flexible washer is in a stepped shape.

10. The projector of claim 1, wherein a guide slot is formed on the external surface of the projection lens for guiding longitudinal movement of the projection lens relative to the holding casing, and a covering sleeve structure extends from the first ring structure for covering the guide slot when the flexible washer jackets the projection lens.

11. An optical lens mechanism comprising:
    a holding casing having a hole structure;
    an optical lens movably disposed through the hole structure, a first engaging structure being formed on an external surface of the optical lens;
    a containing casing detachably fixed to the holding casing for forming a containing space;
    an optical image processing module disposed in the containing space for performing optical image processing cooperatively with the optical lens; and
    a flexible washer jacketing the optical lens and having a first ring structure, a connection ring structure, and a second ring structure, the first ring structure having a second engaging structure formed thereon corresponding to the first engaging structure, the first engaging structure being engaged with the second engaging structure for positioning the first ring structure on the optical lens when the flexible washer jackets the optical lens, the connection ring structure extending from the first ring structure to the second ring structure, the second ring structure being clamped between the holding casing and the containing casing for sealing the containing space cooperatively with the connection ring structure and the first ring structure when the containing casing is fixed to the holding casing.

12. The optical lens mechanism of claim 11, wherein a thickness of the first ring structure is larger than a thickness of the connection ring structure in a radial direction of the flexible washer.

13. The optical lens mechanism of claim 11, wherein the first engaging structure is an engaging rib, the second engaging structure is an engaging groove, and the engaging rib is engaged with the engaging groove in an interference fitting manner.

14. The optical lens mechanism of claim 13, wherein a cross-sectional surface of the first ring structure along the radial direction of the flexible washer is U-shaped for forming the engaging groove to be engaged with the engaging rib.

15. The optical lens mechanism of claim 11, wherein the second ring structure has a first engaging groove formed thereon corresponding to a periphery of the hole structure, and the periphery of the hole structure is engaged with the first engaging groove for positioning the second ring structure on the holding casing.

16. The optical lens mechanism of claim 15, wherein the periphery of the hole structure is engaged with the first engaging groove in an interference fitting manner.

17. The optical lens mechanism of claim 15, wherein the containing casing has an engaging rib protruding toward the holding casing for clamping the second ring structure cooperatively with the holding casing, the second ring structure further has a second engaging groove formed thereon corresponding to the engaging rib, and the engaging rib is engaged with the second engaging groove for positioning the containing casing on the holding casing.

18. The optical lens mechanism of claim 11, wherein a thickness of the second ring structure is larger than a thickness of the connection ring structure in a radial direction of the flexible washer.

19. The optical lens mechanism of claim 11, wherein a cross-sectional surface of the connection ring structure along a radial direction of the flexible washer is in a stepped shape.

20. The optical lens mechanism of claim 11, wherein a guide slot is formed on the external surface of the optical lens for guiding longitudinal movement of the optical lens relative to the holding casing, and a covering sleeve structure extends from the first ring structure for covering the guide slot when the flexible washer jackets the optical lens.

* * * * *